(12) United States Patent
Benisty

(10) Patent No.: US 11,500,772 B2
(45) Date of Patent: *Nov. 15, 2022

(54) METHOD AND APPARATUS FOR CACHE WRITE OVERLAP HANDLING

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,188

(22) Filed: Jul. 9, 2020

(65) Prior Publication Data

US 2020/0371933 A1 Nov. 26, 2020

Related U.S. Application Data

(63) Continuation of application No. 16/003,914, filed on Jun. 8, 2018, now Pat. No. 10,733,100.

(Continued)

(51) Int. Cl.
*G06F 3/06* (2006.01)
*G06F 12/0815* (2016.01)
(Continued)

(52) U.S. Cl.
CPC .......... *G06F 12/0815* (2013.01); *G06F 3/061* (2013.01); *G06F 3/0656* (2013.01); *G06F 3/0679* (2013.01); *G06F 12/0804* (2013.01); *G06F 12/0855* (2013.01); *G06F 12/0868* (2013.01); *G06F 12/0871* (2013.01); *G06F 2212/1024* (2013.01); *G06F 2212/1032* (2013.01); *G06F 2212/1056* (2013.01);
(Continued)

(58) Field of Classification Search
CPC .. G06F 12/0815; G06F 12/0855; G06F 3/061; G06F 3/0656; G06F 3/0679
USPC ........................................................ 711/140
See application file for complete search history.

(56) References Cited

U.S. PATENT DOCUMENTS 10,733,100 B2 * 8/2020 Benisty ............... G06F 12/0815
2010/0281219 A1 11/2010 Lippert et al.
(Continued)

*Primary Examiner* — Than Nguyen
(74) *Attorney, Agent, or Firm* — Patterson & Sheridan, LLP; Steven H. VerSteeg

(57) ABSTRACT

Embodiments of the present disclosure generally relate to a target device handling overlap write commands. In one embodiment, a target device includes a non-volatile memory and a controller coupled to the non-volatile memory. The controller includes a random accumulated buffer, a sequential accumulated buffer, and an overlap accumulated buffer. The controller is configured to receive a new write command, classify the new write command, and write data associated with the new write command to one of the random accumulated buffer, the sequential accumulated buffer, or the overlap accumulated buffer. Once the overlap accumulated buffer becomes available, the controller first flushes to the non-volatile memory the data in the random accumulated buffer and the sequential accumulated buffer that was received prior in sequence to the data in the overlap accumulated buffer. The controller then flushes the available overlap accumulated buffer, ensuring that new write commands override prior write commands.

20 Claims, 3 Drawing Sheets

Related U.S. Application Data

(60) Provisional application No. 62/518,260, filed on Jun. 12, 2017.

(51) Int. Cl.
  *G06F 12/0804* (2016.01)
  *G06F 12/0868* (2016.01)
  *G06F 12/0855* (2016.01)
  *G06F 12/0871* (2016.01)

(52) U.S. Cl.
  CPC .. *G06F 2212/214* (2013.01); *G06F 2212/312* (2013.01); *G06F 2212/7203* (2013.01)

(56) References Cited

U.S. PATENT DOCUMENTS

| | | | |
|---|---|---|---|
| 2011/0099323 A1* | 4/2011 | Syu | G06F 12/0246 |
| | | | 711/E12.001 |
| 2012/0095966 A1* | 4/2012 | Yogev | G06F 12/0238 |
| | | | 707/648 |
| 2012/0198174 A1 | 8/2012 | Nellans et al. | |
| 2015/0026411 A1 | 1/2015 | Lippert et al. | |
| 2015/0309933 A1 | 10/2015 | Nellans et al. | |
| 2017/0192889 A1* | 7/2017 | Sato | G06F 3/0659 |
| 2018/0018101 A1 | 1/2018 | Benisty et al. | |
| 2018/0039424 A1* | 2/2018 | Cui | G06F 12/0292 |
| 2020/0294616 A1* | 9/2020 | Helmick | G06F 3/0688 |
| 2020/0341897 A1 | 10/2020 | Benisty | |

* cited by examiner

METHOD AND APPARATUS FOR CACHE WRITE OVERLAP HANDLING

CROSS-REFERENCE TO RELATED APPLICATIONS

This application is a continuation application of U.S. patent application Ser. No. 16/003,914, now U.S. Pat. No. 10,733,100, filed on Jun. 8, 2018, which application claims benefit of U.S. Provisional Patent Application Ser. No. 62/518,260, filed Jun. 12, 2017, both of which are herein incorporated by reference.

BACKGROUND OF THE DISCLOSURE

Field of the Disclosure

Embodiments of the present disclosure generally relate to a target device for handling overlap write scenarios, such as a solid state drive (SSD).

Description of the Related Art

In order to increase write performance of a target device, such as a data storage device, the data storage device usually caches write data from a host device in a temporal buffer residing in either SRAM or DRAM before writing the data to non-volatile memory (NVM). The data storage device posts a completion message to the host even before writing the data to NVM.

When supporting write caching mechanisms, a cache coherency logic is implemented in data storage devices in order to avoid coherency issues. For instance, when a data storage device receives two write commands that have a logical block address (LBA) overlap between them, the cache coherency logic does not allow the data associated with the first command received to override the data associated with the second command. When a data storage device detects cache coherency issues, the cache coherency logic either breaks the data pipeline or stops receiving any new host commands until the coherency issues are resolved by flushing all write cache data to NVM before receiving any new write commands. Thus, current solutions to cache coherency issues adversely add extra complexity and degrade performance of the data storage device.

Therefore, there is a need for an improved data storage device.

SUMMARY OF THE DISCLOSURE

Embodiments of the present disclosure generally relate to a target device handling overlap write commands. In one embodiment, a target device includes a non-volatile memory and a controller coupled to the non-volatile memory. The controller includes a random accumulated buffer, a sequential accumulated buffer, and an overlap accumulated buffer. The controller is configured to receive a new write command, classify the new write command, and write data associated with the new write command to one of the random accumulated buffer, the sequential accumulated buffer, or the overlap accumulated buffer. Once the overlap accumulated buffer becomes available, the controller first flushes to the non-volatile memory the data in the random accumulated buffer and the sequential accumulated buffer that was received prior in sequence to the data in the overlap accumulated buffer. The controller then flushes the available overlap accumulated buffer, ensuring that new write commands override prior write commands.

In one embodiment, a data storage device comprises a non-volatile memory, and a controller coupled to the non-volatile memory. The controller comprises a random accumulated buffer, a sequential accumulated buffer, and an overlap accumulated buffer. The controller is configured to receive a new write command, classify the new write command, and write data associated with the new write command to one of the random accumulated buffer, the sequential accumulated buffer, or the overlap accumulated buffer based on the classification of the new write command.

In another embodiment, a storage system comprises a host device, and a data storage device coupled to the host device. The data storage device comprises a non-volatile memory, and a controller coupled to the non-volatile memory. The controller is configured to receive a new write command, push data associated to the new write command to one of a random stream, a sequential stream, or an overlap stream, and post a write command completion message to the host after the data associated with the new write command is pushed to one of the random stream, the sequential stream, or the overlap stream.

In one embodiment, a method of handling write overlap data streams comprises receiving data to a controller in a sequence, detecting a cache collision of the data, and classifying the data as overlap data, random data, or sequential data. The method further comprises writing random data to a random buffer, writing sequential data to a sequential buffer, and writing overlap data to an overlap buffer, and emptying the overlap data buffer. Emptying the overlap data buffer comprises flushing the random data and the sequential data that were received prior to the overlap data in the sequence to a non-volatile memory, and flushing the overlap data to the non-volatile memory.

In another embodiment, a method comprises detecting a first accumulated buffer of a controller is available to empty to a non-volatile memory, determining the first accumulated buffer is associated with an overlap stream, and delaying the emptying of the first accumulated buffer to the non-volatile memory. The method further comprises flushing a second accumulated buffer associated with a random stream, flushing a third accumulated buffer associated with a sequential stream, and emptying the first accumulated buffer to the non-volatile memory.

In another embodiment, a data storage device comprises a non-volatile memory, means for detecting a cache collision, and means for ensuring that new write commands override prior write commands. The means for ensuring that new write commands override prior write commands comprises a random accumulated buffer, a sequential accumulated buffer, and an overlap accumulated buffer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a target device handling overlap write commands. In one embodiment, a target device includes a non-volatile memory and a controller coupled to the non-volatile memory. The controller includes a random accumulated buffer, a sequential accumulated buffer, and an overlap accumulated buffer. The controller is configured to receive a new write command, classify the new write command, and write data associated with the new write command to one of the random accumulated buffer, the sequential accumulated buffer, or the overlap accumulated buffer. Once the overlap accumulated buffer becomes available, the controller first flushes to the non-volatile memory the data in the random accumulated buffer and the sequential accumulated buffer that was received prior in sequence to the data in the overlap accumulated buffer. The controller then flushes the available overlap accumulated buffer, ensuring that new write commands override prior write commands.

Figure 1:
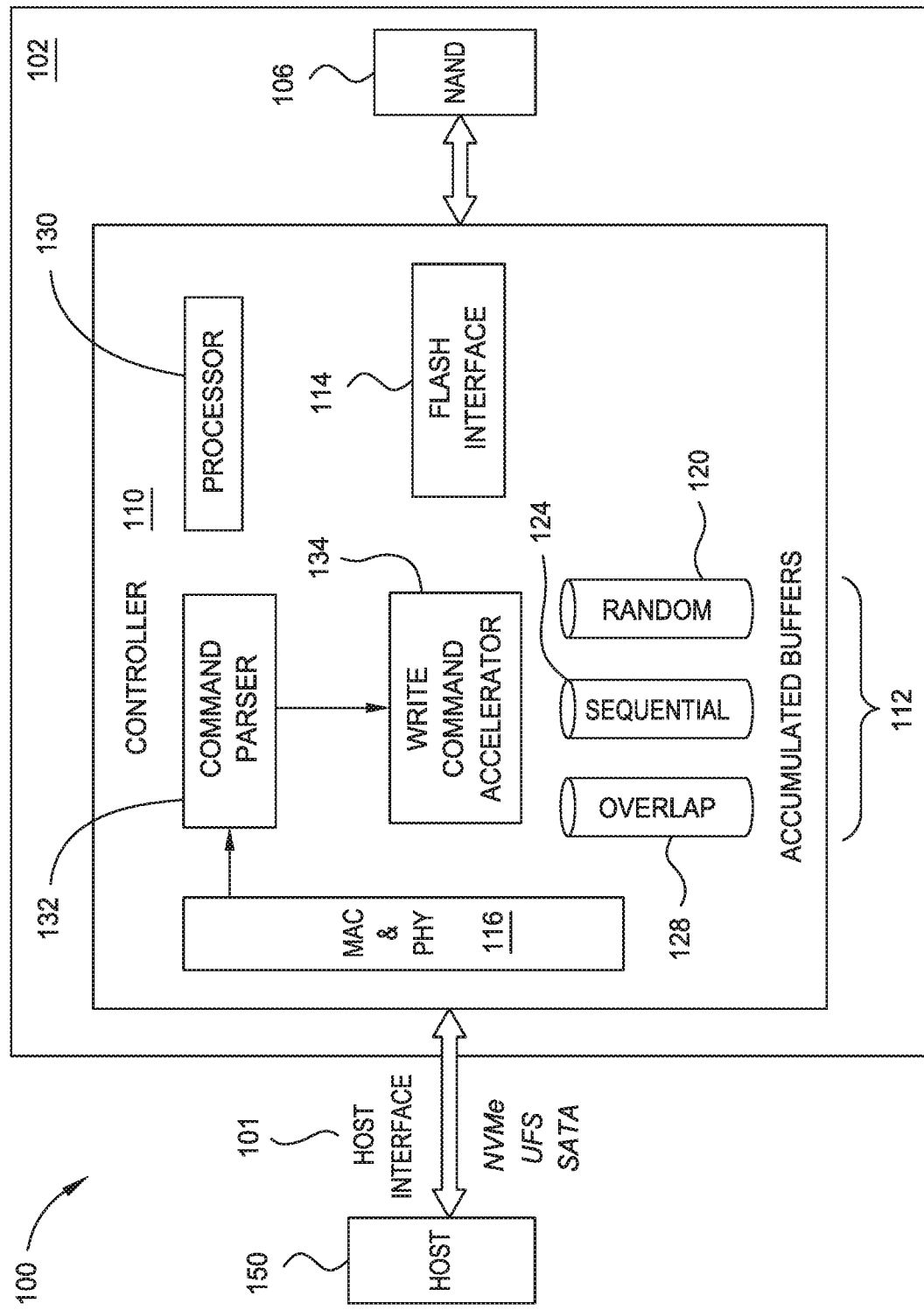
FIG. 1 is a schematic illustration of a system including a host and a target device, according to one embodiment.

FIG. 1 is a schematic illustration of a storage system 100, according to one embodiment. The system 100 includes an initiator or host 150 and one or more target devices, such as a data storage device 102, coupled to the host 150. The host 150 utilizes a non-volatile memory (NVM) 106 included in the data storage device 102 to store and retrieve data. The data storage device 102 may be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The data storage device 102 may take the form of an embedded mass storage device, such as an eSD/eMMC embedded flash drive, embedded in host 150.

The host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, the host 150 includes any device having a processing unit or any form of hardware capable of processing data, including a general purpose processing unit (such as a central processing unit (CPU)), dedicated hardware (such as an application specific integrated circuit (ASIC)), configurable hardware such as a field programmable gate array (FPGA), or any other form of processing unit configured by software instructions, microcode, or firmware.

The host 150 interacts with the data storage device 102 through a host interface 101. In certain embodiments, the storage system 100 operates following the non-volatile memory express (NVMe) protocol. In other embodiments, storage system 100 operates following Universal Flash Storage (UFS), serial advanced technology attachment (SATA), serially attached SCSI (SAS), advanced technology attachment (ATA), parallel-ATA (PATA), Fibre Channel Arbitrated Loop (FCAL), small computer system interface (SCSI), peripheral component interconnect (PCI), PCI-express (PCIe), and other suitable protocols.

The NVM 106 of the data storage device 102 is configured for long-term storage of information as non-volatile memory space and retains information after power on/off cycles. In at least one implementation, the NVM 106 consists of one of more dies of NAND flash memory. Other examples of NVM 106 may include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in the data storage device 102. Each platter may contain one or more regions of one or more tracks of data.

The data storage device 102 includes a controller 110, which manages operations of the data storage device 102, such as writes to and reads from the NVM 106. The controller 110 interfaces with the host 150 via mac and phy components 116, and interfaces with the NVM 106 though a NVM interface 114. The controller 110 includes a command parser 132 responsible for fetching and parsing commands from the host 150 and queuing them internally to a command accelerator 134. The controller 110 includes one or more processors 130, which may be multi-core processors. The processors 130 handle the components of the data storage device 102 through firmware code. The controller 110 further contains LBAs that are mapped or linked to physical block addresses (PBAs) of the storage elements in the NVM 106.

The controller 110 also includes volatile memory or cache 112 for short-term storage or temporary memory during operation of the data storage device 102. The cache 112 does not retain stored data if powered off. Examples of volatile memories include random access memories (RAM), dynamic random access memories (DRAM), static random access memories (SRAM), and other forms of volatile memories. The cache 112 includes a random accumulated buffer 120 for supporting random data streams, a sequential accumulated buffer 124 for supporting sequential data streams, and an overlap accumulated buffer 128 for supporting overlap data streams. Each data stream is comprised of one or more write commands received from the host 150.

Figure 2:
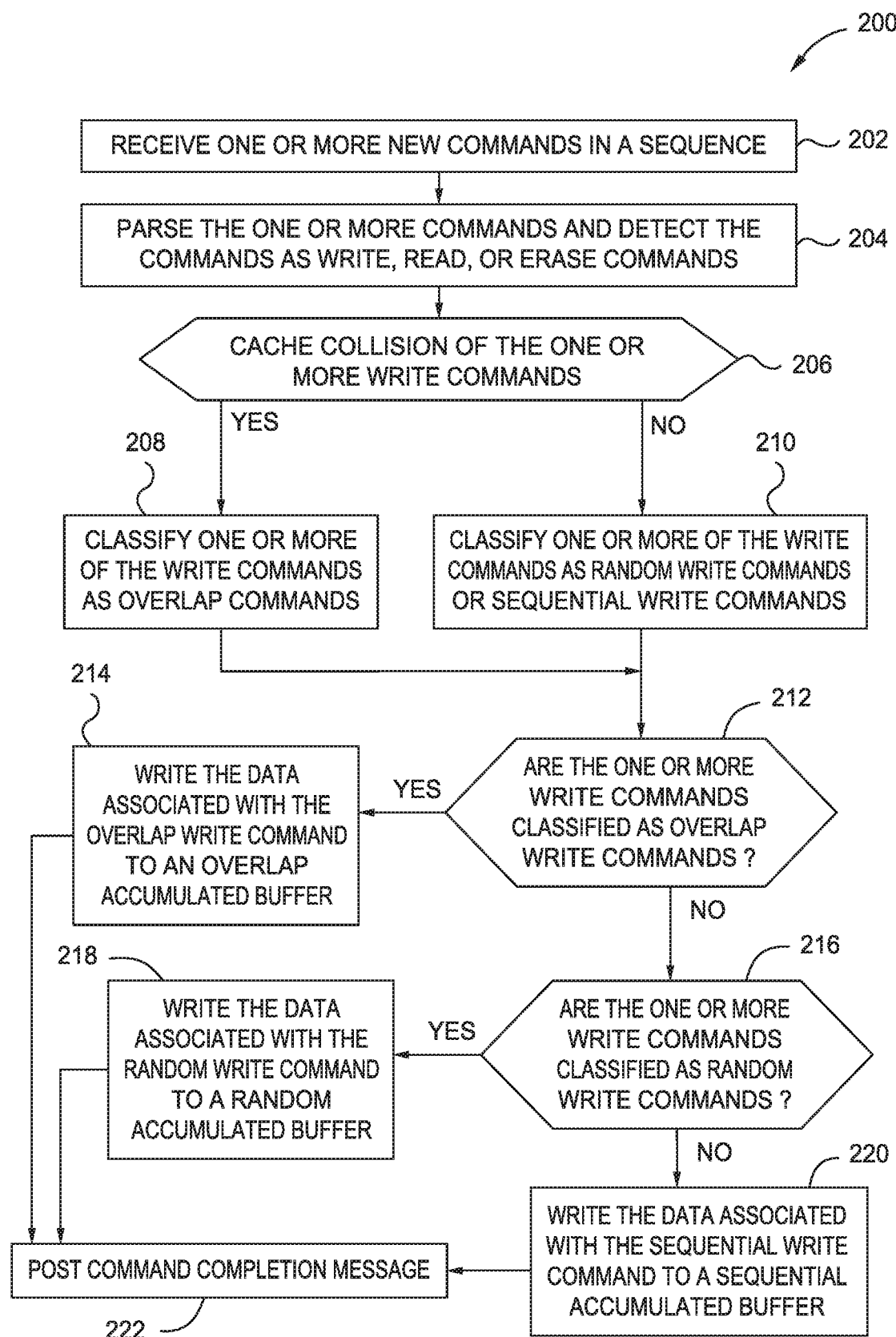
FIG. 2 is a method of a target device receiving data from a host and pushing the data to a cache, according to one embodiment.

FIG. 2 illustrates a method 200 of a target device or a data storage device receiving data from a host and pushing the data to a cache, according to one embodiment. Method 200 will be described in reference to storage system 100 of FIG. 1, but other systems are possible. One or more operations of method 200 may be performed by the controller 110 of FIG. 1 executing machine-executable instructions in a non-transitory machine readable medium by a computer, hardware, a processor (e.g., a microprocessor), and/or machine.

In operation 202, one or more new commands are fetched or received by the controller 110 from the host 150 in a sequence. The one or more new commands are fetched or received depending on the host protocol. The controller 110 fetches the commands in NVMe protocol whereas the controller 110 receives the commands from queuing from the host 150 in UFS protocol or SATA protocol. For ease of description, the term "receiving" will encompass fetching, receiving, and arrival.

In operation 204, the commands are parsed and detected as write commands, read commands, or erase commands by the command parser 132. The command parser 132 may further ensure there are no errors in the commands. If one or more commands are detected as write commands, method 200 proceeds to operation 206.

In operation 206, the controller 110 determines whether there is a cache collision of the one or more write commands. A cache collision occurs when a new write command is received having an LBA range that overlaps with an LBA range of data currently stored in the cache 112 and not stored in NVM 106. A cache collision may be detected by a collision table inputted with the write command sequence in order of receipt by the data storage device 102 and inputted with an LBA range of the data associated with the write command. If the controller 110 detects a cache collision, method 200 proceeds to operation 208.

In operation 208 one or more of the write commands are classified as overlap write commands. In other words, when the LBA range on a new write command overlaps with LBAs stored in cache 112, the data associated with the new write command is classified as an overlap write command. If one or more write commands are classified as overlap write commands, method 200 proceeds to operation 212.

If in operation 206 the controller determines there is no cache collision, method 200 proceeds to operation 210. In operation 210, one or more of the write commands are classified as either random write commands for random data or sequential write commands for sequential data by the command parser 132. For example, when a write command has a large size of associated data (such as sized 32 KB or more), the write command may be classified as a sequential write command. For example, when a write command has small size of associated data, the write command may be classified as a random write command. The command parser 132 may perform a locality detection in order to determine whether the write commands should be classified as random write commands or sequential write commands. After classifying the write commands as random or sequential, method 200 proceeds to operation 212.

In operation 212, the controller 110 determines if one or more of the write commands are classified as overlap write commands. For an overlap write command, the controller 110 pushes or writes the data associated with the overlap write command to the overlap accumulated buffer 128 in operation 214. If the controller 110 determines that one or more of the write commands are not classified as overlap write commands, method 200 proceeds to operation 216.

In operation 216, the controller 110 determines if one or more of the write commands are classified as random write commands. For a random write command, the controller 110 pushes or writes the data associated with the random write command to the random accumulated buffer 120 in operation 218. If the controller 110 determines that one or more of the write commands are not classified as random write commands, method 200 proceeds to operation 220, where the controller 110 pushes or writes the data associated with a sequential write command to the sequential accumulated buffer 124. For each stream, the write data associated with the write commands is accumulated separately in the overlap, random, and sequential buffers.

In operation 222, when data associated with the one or more write commands are written to one of the separate buffers 120, 124, 128, a command completion message is posted to the host 150.

Embodiments of method 200 permit a target device, such as the data storage device 102, to receive any type of write commands without any performance degradation faced by the host 150. The data storage device 102 is operable to keep receiving new data commands from the host 150 and to keep posting command completion to the host 150 even in the event of overlap data or write cache collision detection.

Figure 3:
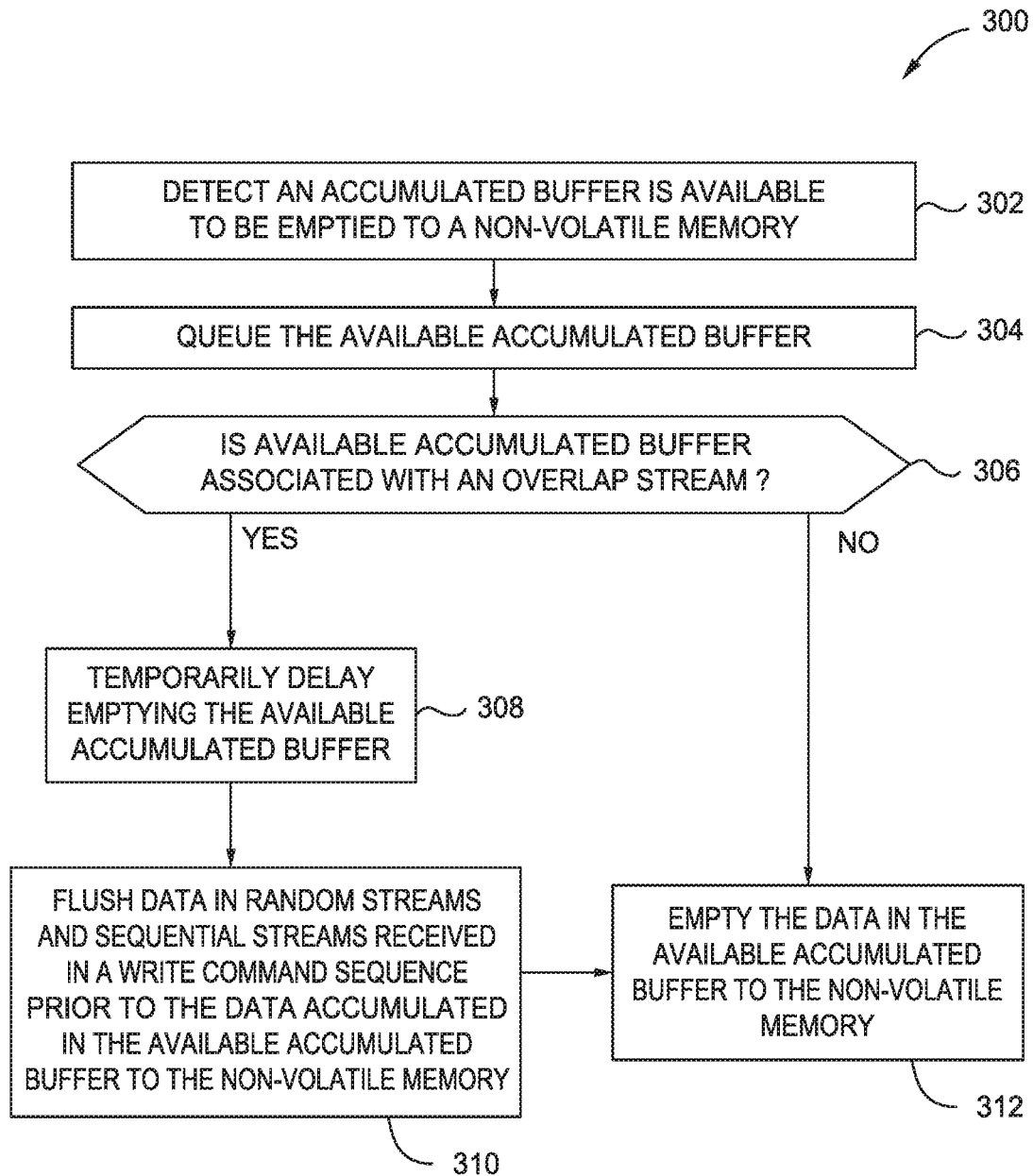
FIG. 3 is a method of writing data from a cache to non-volatile memory, according to one embodiment.

FIG. 3 is a method 300 of writing data from a cache to NVM, according to one embodiment. Method 300 will be described in reference to system 100 of FIG. 1 with cache 112 including the random accumulated buffer 120, sequential accumulated buffer 124, and overlap accumulated buffer 128, but other systems are possible. Method 300 may be used in conjunction with method 200 of FIG. 2. One or more operations of method 300 may be performed by the controller 110 of FIG. 1 executing machine-executable instructions in a non-transitory machine readable medium by a computer, hardware, a processor (e.g., a microprocessor), and/or machine.

In operation 302, the controller 110 detects that one or more of the accumulated buffers 120, 124, 128 are available to be emptied to the NVM 106. In at least one implementation, an accumulated buffer becomes available after accumulating enough data, such as by meeting or crossing a pre-configured threshold of data, when having a timeout or after a predetermined amount of time has passed, or when a flush request is received. In one embodiment, the threshold for making an accumulated buffer available is 512 KB or more.

In operation 304, the available accumulated buffer identified in operation 302 is queued in a hardware engine (such as for magnetic disk NVM) or to firmware (such as for NAND flash NVM or other solid state NVM) to be written to the NVM 106.

In operation 306, the controller 110 determines if the available accumulated buffer queued in operation 304 is an accumulated buffer associated with an overlap stream, such as the overlap accumulated buffer 128. If the controller 110 determines that the available accumulated buffer is not associated with an overlap stream, and is an accumulated buffer associated with a random stream or a sequential stream, such as the random accumulated buffer 120 or the sequential accumulated buffer 124, the method 300 proceeds directly to operation 312. In operation 312, the data in the available accumulated buffer is emptied to the NVM 106. After writing the flushed data to the NVM 106, the relevant LBAs are removed from a collision table, such as the collision table of operation 206 of FIG. 2.

If in operation 306 the controller 110 determines that the available accumulated buffer is associated with an overlap stream, the method 300 proceeds to operation 308. In operation 308, the emptying of the available overlap accumulated buffer is temporarily delayed. The emptying of the available overlap accumulated buffer is delayed for so long as it takes the controller 110 to complete operation 310.

In operation 310, the controller 110 flushes to the NVM 106 data in random streams and sequential streams that was received in a write command sequence prior to the data accumulated in the available overlap accumulated buffer. In other words, all random and sequential write commands that are received prior in the sequence to any overlap write command stored in the available overlap accumulated buffer are flushed to the NVM 106. The random and sequential write commands are flushed to the NVM 106 even if the associated random accumulated buffer and sequential accumulated buffer are not currently available. The method 300 then proceeds to operation 312, where the data in the available overlap accumulated buffer is emptied to the non-volatile memory. After writing the flushed data to the NVM 106, the relevant LBAs are removed from a collision table, such as the collision table of operation 206 of FIG. 2.

Thus, random write commands and sequential write commands received in prior sequence order to the overlap write commands stored in the available overlap accumulated buffer are first flushed to the NVM 106 before flushing the overlap write commands. As such, data from the overlap write commands stored in the available accumulated buffer will override the prior data commands. When the available overlap accumulated buffer is flushed to the NVM 106, the overlap write commands are written to the NVM 106 in the order of receipt by target (i.e., in the order of a write command sequence) to help ensure that new write commands overrides prior write commands.

Additional commands may continue to be received and accumulated in the random accumulated buffer, the sequential accumulated buffer, and the overlap accumulated buffer as method 300 is performed. However, only the data associated with random and sequential commands that were received prior in the write command sequence to the overlap commands in the available overlap accumulated buffer are flushed to the NVM 106. The additional commands are queued later in sequence.

From the point of view of the host 150, the execution of overlap write commands is identical to the execution of random write commands or sequential write commands. This prevents the host 150 from facing any performance degradation from the data storage device 102 while executing the overlap commands.

Embodiments of method 300 permit the data storage device 102 to handle overlap write data in compliance with host protocols to ensure that prior write commands do not override new write commands. Method 300 is operable to handle overlap write data without any performance degradation faced by the host 150.

Certain embodiments disclosed herein relate to a target device using a separate buffer to cache data associated with overlap data and to flush this separate data while ensuring that new write commands overrides prior write commands. Certain embodiments disclosed herein keep a pipeline open between a host and a target device without having performance degradation of the pipeline even in overlap write scenarios.

EXAMPLES

The following are examples to illustrate various embodiments of handling write overlap data streams. For illustration purposes, the examples will be described in reference to FIGS. 1-3. Such examples are not meant to limit the scope of the disclosure unless specifically set forth in the claims.

Example 1

In TABLE 1, a sequence of eleven write commands were queued in the cache 112 of the data storage device 102 in the order of receipt from the host 150, and chronicled in the write command sequence 0 to 10. In this example, the data of each write command is associated with an LBA or LBA range, random data has a size of up to about 4 KB, sequential data has a size of 32 KB or more, and a threshold for making a buffer available is 512 KB or more, but other parameters are possible.

Per method 200, the first eight commands (write command sequence 0-7) received are classified as random write commands based on size and no overlap was detected in respect to previously queued write commands. As such, the write data of the first eight commands is accumulated in the random accumulated buffer 120. The ninth command (write command sequence 8) is classified as an overlap write command since there is an LBA range overlap between this command and the seventh command as long as the data of the seventh command has not yet been flushed to the NVM 106. The write data of the ninth command is accumulated in the overlap accumulated buffer 128.

The tenth command (write command sequence 9) is classified as a sequential write command because the size of the command is 32 KB and no overlap was detected in respect to previously queued write commands. The write data of the tenth command is accumulated in the sequential accumulated buffer 124. The eleventh command (write command sequence 10) is classified as an overlap write command since there is an LBA range overlap between this command and the first command, the ninth command, and the tenth command, as a long as the data of first, ninth, and tenth commands have not yet been flushed to the NVM 106. The write data of the eleventh command is accumulated in the overlap accumulated buffer 128.

TABLE 1

| Write command sequence | LBA range | Command classification |
| --- | --- | --- |
| 0 | 66 | Random |
| 1 | 100 | Random |
| 2 | 3000 | Random |
| 3 | 300 | Random |
| 4 | 406 | Random |
| 5 | 587 | Random |
| 6 | 6 | Random |
| 7 | 7870 | Random |
| 8 | 5-7 | Overlap |
| 9 | 128-135 | Sequential |
| 10 | 7-134 | Overlap |

Per method 300, the eleventh command (write command sequence 10) causes the overlap accumulated buffer to cross the threshold of 512 KB. Prior to flushing the overlap accumulated buffer to the NVM 106, the data associated with the first write command through the eighth write command and the tenth write command (write command sequences 0-7 and 9) are flushed to the NVM 106 in the order received from the host 150 to empty the random accumulated buffer 120 and the sequential accumulated buffer 124. The data associated with overlap accumulated buffer 128 is then flushed to the NVM 106.

Since the data associated with the seventh command (write command sequence 6) is flushed to the NVM 106 prior to the data associated with the ninth command (write command sequence 8), the new data of the ninth command overrides the prior data of the seventh command.

Likewise, since the data associated with the first command (write command sequence 0), the ninth command (write sequence 8), and the tenth command (write command sequence 9) is flushed to the NVM 106 prior to the data associated with the eleventh command (write command sequence 10), the new data of the eleventh command overrides the prior data.

Example 2

In a second example referring to TABLE 1, the random accumulated buffer 120 becomes available after receiving the sixth command (write command sequence 5). Per method 300, once the controller 110 determines the available accumulated buffer is not an overlap accumulated buffer, the available random accumulated buffer may immediately be emptied to the NVM 106. The controller 110 need not flush data associated with the overlap accumulated buffer or the sequential accumulated buffer prior to flushing the data associated with the random accumulated buffer.

The host 150 does not face any performance degradation as the data storage device 102 executes all of the commands of TABLE 1. Additionally, the latest version of data received overrides an earlier version of the data received previously.

The methods and apparatus discussed above allow a target device or a data storage device to handle overlap write data in compliance with host protocols to ensure that prior write commands do not override new write commands. By utilizing a random accumulated buffer, a sequential accumulated buffer, and an overlap accumulated buffer, cache coherency issues can be avoided without breaking the data pipeline. Thus, the storage system is able to handle overlap write data without any performance degradation faced by the host.

In one embodiment, a data storage device comprises a non-volatile memory, and a controller coupled to the non-volatile memory. The controller comprises a random accumulated buffer, a sequential accumulated buffer, and an overlap accumulated buffer. The controller is configured to receive a new write command, classify the new write command, and write data associated with the new write command to one of the random accumulated buffer, the sequential accumulated buffer, or the overlap accumulated buffer based on the classification of the new write command.

The data storage device may further comprise a command parser and/or a write command accelerator. The controller may be further configured to detect a cache collision of the new write command. The new write command may be classified as an overlap write command when a cache collision is detected. The random accumulated buffer may store one or more write commands classified as random, the sequential accumulated buffer may store one or more write commands classified as sequential, and the overlap accumulated buffer may store one or more write commands classified as overlap.

In another embodiment, a storage system comprises a host device, and a data storage device coupled to the host device. The data storage device comprises a non-volatile memory, and a controller coupled to the non-volatile memory. The controller is configured to receive a new write command, push data associated to the new write command to one of a random stream, a sequential stream, or an overlap stream, and post a write command completion message to the host after the data associated with the new write command is pushed to one of the random stream, the sequential stream, or the overlap stream.

The overlap stream may comprise one or more overlap accumulated buffers, the random stream may comprise one or more random accumulated buffers, and the sequential stream may comprise one or more sequential accumulated buffers. The controller may be further configured to empty the random stream, the sequential stream, or the overlap stream to the non-volatile memory after posting the write command completion message to the host. The controller may receive the new write command by fetching the new write command from the host. The controller may receive the new write command from the host queueing the new write command to the controller.

In one embodiment, a method of handling write overlap data streams comprises receiving data to a controller in a sequence, detecting a cache collision of the data, and classifying the data as overlap data, random data, or sequential data. The method further comprises writing random data to a random buffer, writing sequential data to a sequential buffer, and writing overlap data to an overlap buffer, and emptying the overlap data buffer. Emptying the overlap data buffer comprises flushing the random data and the sequential data that were received prior to the overlap data in the sequence to a non-volatile memory, and flushing the overlap data to the non-volatile memory.

Detecting the cache collision may comprise determining a logical block address range associated with the data overlaps with a logical block address range of data currently stored in the random buffer or the sequential buffer. Flushing the overlap data may overwrite a portion of the random data or a portion of the sequential data flushed to the non-volatile memory. Classifying the received data as overlap data may be based on the detected cache collision. Classifying the data as random data or sequential data may be based on a locality detection.

In another embodiment, a method comprises detecting a first accumulated buffer of a controller is available to empty to a non-volatile memory, determining the first accumulated buffer is associated with an overlap stream, and delaying the emptying of the first accumulated buffer to the non-volatile memory. The method further comprises flushing a second accumulated buffer associated with a random stream, flushing a third accumulated buffer associated with a sequential stream, and emptying the first accumulated buffer to the non-volatile memory.

The first accumulated buffer may become available by meeting a pre-configured threshold of data. The first accumulated buffer may become available when a flush request is received. The first accumulated buffer may become available after a predetermined amount of time has passed. Write commands written to the second accumulated buffer or the third accumulated buffer may be received in a write command sequence prior to write commands written to the first accumulated buffer.

The method may further comprise detecting a fourth accumulated buffer is available to empty to the non-volatile memory, determining the fourth accumulated buffer is associated with one of the random stream or the sequential stream, and flushing the fourth accumulated buffer to the non-volatile memory.

In another embodiment, a data storage device comprises a non-volatile memory, means for detecting a cache collision, and means for ensuring that new write commands override prior write commands. The means for ensuring that new write commands override prior write commands comprises a random accumulated buffer, a sequential accumulated buffer, and an overlap accumulated buffer.

The non-volatile memory may comprise a NAND flash memory. The data storage device may further comprise means for classifying new write commands as random, sequential, or overlap. The data storage device may further comprise means for detecting when the random accumulated buffer, the sequential accumulated buffer, or the overlap accumulated buffer are available to empty to the non-volatile memory.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller configured to write data associated with a write command to one of a random accumulated buffer, a sequential accumulated buffer, or an overlap accumulated buffer based on a classification of the write command, wherein the random accumulated buffer, the sequential accumulated buffer, and the overlap accumulated buffer are in the controller.

2. The data storage device of claim 1, wherein the controller further comprises a command parser.

3. The data storage device of claim 1, wherein the controller further comprises a write command accelerator.

4. The data storage device of claim 1, wherein the controller is further configured to detect a cache collision of the write command.

5. The data storage device of claim 4, wherein the write command is classified as an overlap write command when a cache collision is detected.

6. The data storage device of claim 1, wherein the random accumulated buffer stores one or more write commands classified as random, the sequential accumulated buffer stores one or more write commands classified as sequential, and the overlap accumulated buffer stores one or more write commands classified as overlap.

7. A data storage device, comprising:
a controller configured to:
fetch one or more commands;
parse and detect each of the one or more commands as a write command, a read command, or an erase command;
classify each of the one or more commands; and
write data associated with each of the one or more commands to a corresponding buffer of a plurality of buffers based on the classification of each of the one or more commands, wherein the plurality of buffers are in the controller.

8. The data storage device of claim 7, wherein the controller is further configured to detect a cache collision of a first command of the one or more commands.

9. The data storage device of claim 8, wherein a collision table is used to detect the cache collision.

10. The data storage device of claim 7, wherein the controller further comprises a cache and a command parser.

11. A data storage device, comprising:
a controller configured to:
fetch one or more commands;
parse and detect each of the one or more commands as a write command, a read command, or an erase command;
classify each of the one or more commands;
write data associated with each of the one or more commands to a buffer based on the classification of each of the one or more commands, wherein the buffer is in the controller;
detect a cache collision of a first command of the one or more commands; and
classify the first command as an overlap write command.

12. A data storage device, comprising:
means to receive a plurality of commands;
means to parse and detect each of the plurality of commands as a write command, a read command, or an erase command;
means to determine one or more commands of the plurality of commands are write commands;
means to classify each of the one or more write commands as overlap write commands, random write commands, or sequential write commands;
means to write data associated with each of the one or more write commands to a corresponding buffer of a plurality of buffers based on the classification of each of the one or more write commands, wherein the plurality of buffers are in the controller; and
means to post a command completion message.

13. The data storage device of claim 12, further comprising a command parser.

14. The data storage device of claim 13, wherein the command parser is configured to:
parse and detect each of the plurality of commands; and
classify the one or more write commands as random write commands and sequential write commands.

15. The data storage device of claim 12, wherein a random accumulated buffer stores data associated with write commands classified as random, a sequential accumulated buffer stores data associated with write commands classified as sequential, and an overlap accumulated buffer stores data associated with write commands classified as overlap.

16. The data storage device of claim 12, further comprising a cache.

17. The data storage device of claim 16, wherein the cache comprises a random accumulated buffer, a sequential accumulated buffer, and an overlap accumulated buffer.

18. The data storage device of claim 12, further comprising means to detect a cache collision.

19. A data storage device, comprising:
means to receive a plurality of commands;
means to parse and detect each of the plurality of commands as a write command, a read command, or an erase command;
means to determine one or more commands of the plurality of commands are write commands;
means to classify each of the one or more write commands as overlap write commands, random write commands, or sequential write commands, wherein a command is classified as an overlap command when a cache collision is detected;
means to write data associated with each of the one or more write commands to a buffer based on the classification of each of the one or more write commands, wherein the buffer is in the controller; and
means to post a command completion message.

20. A data storage device, comprising:
means to receive a plurality of commands;
means to parse and detect each of the plurality of commands as a write command, a read command, or an erase command;

means to determine one or more commands of the plurality of commands are write commands;
means to classify each of the one or more write commands as overlap write commands, random write commands, or sequential write commands;
means to write data associated with each of the one or more write commands to a buffer based on the classification of each of the one or more write commands, wherein the buffer is in the controller;
means to post a command completion message;
means to detect a cache collision; and
means to classify a command as an overlap write command when a cache collision is detected.

\* \* \* \* \*